July 17, 1962 J. G. FORD 3,044,900
ELECTRICAL APPARATUS HAVING A COATING CONSISTING OF RESINOUS
POLYMERIC EPOXIDE CONTAINING FINELY DIVIDED ALUMINUM
OXIDE TRIHYDRATE AND RESINOUS POLYAMIDE
Filed March 11, 1959

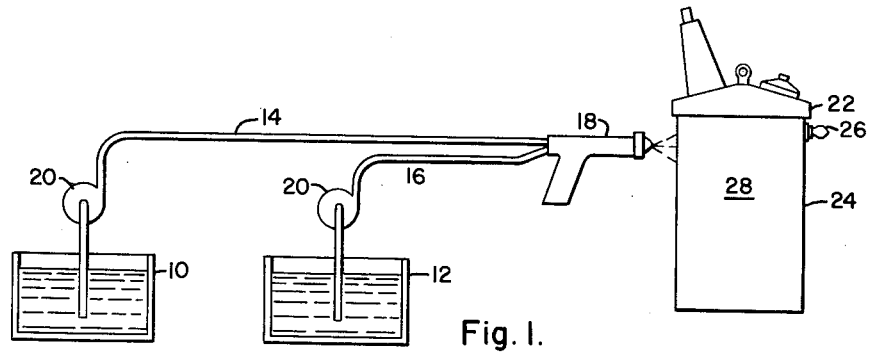

Fig. 1.

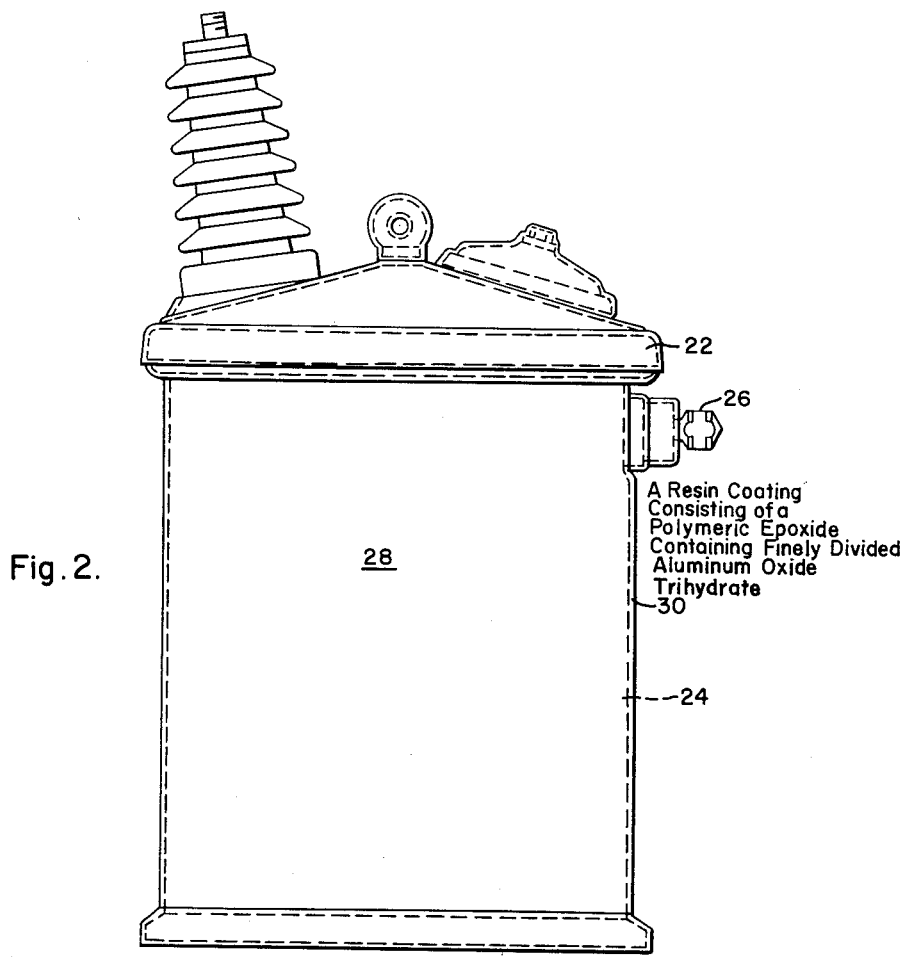

Fig. 2.

A Resin Coating Consisting of a Polymeric Epoxide Containing Finely Divided Aluminum Oxide Trihydrate WITNESSES:
Bernard R. Gieguey
James F. Young INVENTOR
James G. Ford
BY
William G. Addison
ATTORNEY

United States Patent Office 3,044,900
Patented July 17, 1962

3,044,900
ELECTRICAL APPARATUS HAVING A COATING CONSISTING OF RESINOUS POLYMERIC EPOXIDE CONTAINING FINELY DIVIDED ALUMINUM OXIDE TRIHYDRATE AND RESINOUS POLYAMIDE
James G. Ford, Sharon, Pa., assignor to Westinghouse Electric Corporation, East Pittsburgh, Pa., a corporation of Pennsylvania
Filed Mar. 11, 1959, Ser. No. 798,763
5 Claims. (Cl. 117—132)

The present invention relates to the insulation of electrical apparatus and has particular reference to resin coated hardware, tanks, and tank covers for electrical distribution transformers, condenser bushings, and the like.

Electrical power companies sometimes suffer service discontinuities created by line "lock-outs." In the past, a number of these "lock-outs" have been the result of bird and animal electrocutions occurring on the tank covers of pole mounted high voltage distribution transformers. In an attempt to prevent such "lock-outs," the high voltage terminals and line leads located on the top of such transformers sometimes have been wrapped with many layers of insulating tape. In other cases, screens and guards of various types and designs have been placed over the terminals and leads to prevent animals and birds from coming into contact therewith. These prior preventive measures, although effective to some degree, materially increase the cost of manufacturing transformers, as well as presenting other shortcomings.

The object of the present invention is to provide processes for insulating electrical apparatus including hardware, tanks, and tank covers of distribution transformers by coating the same with a hardened resin combination including specific epoxy resins, polyamide resins, and a critical amount of filler.

Another object of this invention is to provide electrical apparatus including hardware, tanks and tank covers for electrical distribution transformers covered with a relatively thick coating of a resin combination including specific epoxy resins, polyamide resins, and a critical amount of a finely divided filler.

Other and further objects of the invention will, in part, be obvious and will, in part, appear hereinafter.

For a more complete understanding of the present invention, reference is made to the following detailed description taken in conjunction with the accompanying drawing, wherein:

FIG. 1 is a front view, partly in cross-section, illustrating one form of apparatus suitable for use in coating a transformer with a resin combination in accordance with this invention; and FIG. 2 is a front view illustrating a distribution transformer tank, tank cover, and associated hardware provided with a relatively thick coating of an insulating resin.

In accordance with this invention and in the attainment of the foregoing objects, electrical apparatus including tanks, tank covers, and associated hardware for electrical distribution transformers are provided with a 10 to 30 mils thick insulating coating of a resin combination comprising an intimate mixture of (A) from 3 to 8 parts by volume of a mixture consisting essentially of from 20% to 40% of at least one normally liquid resinous polymeric epoxide, from 25% to 40% of a finely divided filler, and the balance solvent, and (B) from 0.5 to 3 parts by volume of a solvent solution of at least one normally liquid polyamide resin.

While the invention is applicable to the resin coating of many different kinds of electrical apparatus used outdoors such as transformers, bushings, circuit breakers, switchgear, motors, generators, and the like, it will be described, for convenience, with particular reference to the coating of pole mounted distribution transformers.

The insulating resin coating is applied uniformly by spraying the same over the entire transformer tank, cover, and associated hardware. Birds and animals which come in contact with any of these parts are not harmed and cannot cause damage to the transformers. The resin coating, in addition to providing electrical insulation for the transformer, also affords excellent corrosion and weather protection for the metal parts which it covers. Transformers coated in accordance with this invention, therefore, are particularly well suited for use near the ocean where they may come in contact with salt spray.

In order to provide a resin insulating system which will deposit heavy films of a thickness of from about 10 to 30 mils in a single application without trapping solvent and without any film defects such as blisters or pin holes, it has been determined that it is essential that only liquid epoxy resins and liquid polyamide resins be employed. Use of solid resins of higher molecular weight invariably leads to case hardening and pin hole formation.

The resinous polymeric epoxides, also known as glycidyl polyethers, employed in preparing the resinous coating compositions of this invention may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxyl groups per molecule. Polynuclear phenols which have been found to be particularly suitable include those wherein the phenolic nuclei are joined by carbon bridges, such for example as 4,4'-dihydroxy-diphenyl - dimethylmethane (referred to hereinafter as Bis-phenol "A") and 4,4'-dihydroxy-diphenyl-methane. In admixture with the named polynuclear phenols, use also may be made of those polynuclear phenols wherein the phenol nuclei are joined by sulfur bridges such, for example, as 4,4'-dihydroxy-diphenyl-sulfone.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalency greater than 1.0. By epoxy equivalency reference is made to the average number of 1,2-epoxy groups

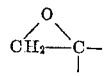

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers thus is a value between 1.0 and 2.0.

Resinous polymeric epoxides or glycidyl polyethers suitable for use in accordance with this invention may be prepared by admixing and reacting from 1 to 2 mol proportions of epihalohydrin, preferably epichlorohydrin, with about 1 mol of Bis-phenol "A" in the presence of at least a stoichiometric excess of alkali based on the amount of halogen.

To prepare the resinous polymeric epoxides, aqueous alkali, Bis-phenol "A" and epichlorohydrin are introduced into and admixed in a reaction vessel. The aqueous alkali serves to dissolve the Bis-phenol "A" with the formation of the alkali salts thereof. If desired, the aqueous alkali and Bis-phenol "A" may be admixed first and then the epichlorohydrin added thereto, or an aqueous solution of alkali and Bis-phenol "A" may be added to the epichlorohydrin. In any case, the mixture is heated in the vessel to a temperature within the range of about 80° C. to 110° C. for a period of time varying from about ½ hour to 3 hours, or more, depending upon the quantity of reactants used. Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

The following example illustrates the preparation of a glycidyl polyether suitable for use in preparing the resinous coating composition of this invention.

*Example 1*

54 parts of sodium hydroxide were dissolved in about 600 parts of water in an open kettle provided with a mechanical stirrer. About 3 mols of Bis-phenol "A" were added and the resultant mixture was stirred for about ten minutes at a temperature of about 30° C. Thereafter, approximately 4 mols of epichlorohydrin were added, whereupon the temperature of the resultant mixture increased to about 60° C. to 70° C. due to the heat of reaction. About 42 parts of caustic soda dissolved in about 9 parts of water then were added with continuous stirring and the mixture was maintained at a temperature of about 90° C. to 100° C. for a period of about one hour. The mixture was then permitted to separate into two layers, the upper layer was withdrawn and discarded and the lower layer was washed with boiling water to which was added acetic acid in an amount sufficient to neutralize unreacted caustic soda. A liquid resinous reactive polymeric epoxide was obtained after substantially all of the wash water had been removed. The liquid resinous polymeric epoxide thus obtained is suitable for use in formulating the resinous combination for application to transformers in accordance with the present invention.

The polyamide resins which are suitable for use in accordance with this invention include those polyamides which are normally liquid. Such liquid polyamides are obtained by interacting polyamines with dimerized fatty acids having from 8 to 24 carbon atoms per molecule. The polyamides obtained contain free primary or secondary amine groups spaced along the molecule.

Broadly, the polyamide resins may be prepared by condensing dimerized vegetable oil fatty acids such as linoleic acid with a suitable polyamine compound such as diethylene triamine. The reactants are blended at relatively low temperatures in a suitable reaction vessel and then gradually heated, with stirring, until all water of reaction has distilled off. The liquid polyamide resin then is withdrawn from the reaction vessel.

Polyamines which are suitable for use in preparing the polyamide resins utilized in this invention include diethylene triamine, triethylene pentamine, triethylene tetramine, tetraethylene pentamine, and the like. The amines may be used singly or in combinations of two or more.

It has been determined that a blend of liquid polymeric epoxide resin and liquid polyamide resin alone does not provide a combination which will deposit a satisfactory coating on transformer tanks. The incorporation of critical amounts of certain solid additives is essential to provide the required reinforcing effect in the resin blend and to provide the necessary tack, flow characteristics, and absense of sagging to the uncured film. Specifically, it has been determined that from about 25% to 50% by weight of the epoxy portion of the resin should comprise a finely divided filler. Examples of such fillers include aluminum oxide, trihydrate, magnesium silicate, titanium dioxide, silica, montmorillonite, bentonite, zinc oxide, calcium carbonate, carbon black, chrome yellow, iron oxide, lead oxide, and the like. These fillers may be used alone or in combinations of two or more.

It has also been determined that improved film coatings are obtained by the incorporation of from about 0.3% to 2% of dimethyl silicone compounds in the resin blend. Such silicone compounds impart improved flow and leveling characteristics to the deposited film coating and completely eliminate any danger of pin holding due to entrapped air.

In the drawing, FIG. 1 illustrates in somewhat schematic form, one suitable form of apparatus for applying the resin combination of this invention to transformer tanks, covers and associated hardware. As illustrated on the drawing, storage tanks 10 and 12 are provided to contain the liquid resinous polymeric epoxide component (A) and the liquid polyamide resin component (B), respectively. Hoses 14 and 16, leading from tanks 10 and 12, respectively, are connected to a suitable spray gun 18. Proportioning pumps 20 are located in hose lines 14 and 16 and serve to regulate the quantity of resin introduced from tanks 10 and 12 into spray gun 18. When the gun is actuated the mixed resin combination is sprayed uniformly over the cover 22, tank side wall 24 and associated hardware 26 of the distribution transformer indicated generally at 28. FIG. 2 illustrates a complete distribution transformer 28 with a covering of cured resin 30 uniformly covering the same. It will be understood, of course that, if desired, the resinous polymeric epoxide and the liquid polyamide resin may be mixed together in a single storage tank and then passed through a single hose to a spray gun. It is not essential that separate storage tanks be employed.

The resin combination of this invention is particularly suitable for being applied from a spray gun at room temperatures, e.g., 28° to 35° C. It has been determined that satisfactory results are obtained when the resin is sprayed at a pressure of about 50 to 65 p.s.i. when the gun is held at a distance of about 10 inches from the transformer tank. The sprayed resin coating, after application to the tank, will harden at room temperature in about 5 to 10 hours or it may be baked in an oven at 125° C. to 175° C. for about 5 to 45 minutes. In addition to spraying, the resin coating may be applied by dipping or by use of a brush. The two resins should not be admixed until just before use to avoid premature gelation.

Particularly satisfactory results are obtained if the tank, tank cover, and associated hardware are cleaned thoroughly prior to application of the resin combination. This may be achieved by sand blasting, degreasing with a detergent or other cleaning solution and following this treatment by priming the metal parts with a suitable epoxy primer paint.

The liquid polymeric epoxide resin component (A) and the liquid polyamide resin component (B) are dissolved in solvents prior to spraying. Organic hydrocarbons are particularly satisfactory and the choice of a particular solvent or solvent mixture is not critical. Thus, xylol, benzene, toluene, ketones, ethyl acetate, butyl acetate, isopropyl alcohol, naphtha, and the like may be used, either singly or in combinations of two or more.

The polyamide resins serve as a curing agent for the liquid polymeric epoxide resins. The terminal epoxy groups on the polymeric epoxide are believed to react with the amine groups spaced along the polyamide resin to yield a complex cross-linked product according to the following equation.

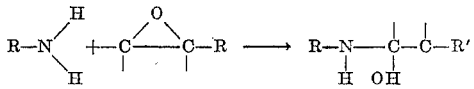

In order to accelerate the cure of the blend of liquid resinous polymeric epoxide and liquid polyamide resin, from about 0.5% to about 5% by weight, based on the total weight of the coating resin blend, of tri-(dimethylaminomethyl) phenol may be added to the blend.

The following specific examples are set forth to illustrate resin compositions which are suitable for use in practicing the present invention.

Example II

| Part A: | Percent |
|---|---|
| Magnesium silicate | 9.19 |
| Titanium dioxide | 22.97 |
| Zinc oxide | 2.30 |
| Calcium carbonate | 13.78 |
| Silicone resin | 0.37 |
| Epoxy resin (liquid) | 22.97 |
| Coal tar xylol | 24.42 |
| High flash naphtha | 4.00 |
| Part B: | |
| Polyamide resin (liquid) | 62.25 |
| Tri-(dimethylaminomethyl) phenol | 5.75 |
| Xylol | 32.00 |

5 parts by volume of Part A and 1 part by volume of Part B are blended thoroughly and then applied to a transformer tank, tank cover, and associated hardware by spraying the same from a commercial spray gun. A film thickness of approximately 30 mils may be applied without the resin running. The coated transformer then is placed in an oven and baked for 30 minutes at 125° C. to cure the applied coating.

Laboratory tests have been carried out to determine the effect on an animal, such as a squirrel, coming in contact with high tension voltage while standing on a transformer coated as described in Example II. The tests showed that a squirrel, under these conditions, would draw a current of only about 75 micro-amperes. A current of 5000 micro-amperes would be required to electrocute the squirrel. The present coatings have dielectric strength in the range of 500 to 800 volts/mil.

These experimental results demonstrate conclusively the effectiveness of this invention in preventing service "lock-outs" resulting from animal electrocution occurring on the tank covers of pole mounted high voltage distribution transformers.

Example III

| Part A (6 parts by volume): | Percent |
|---|---|
| Epoxy resin (liquid) | 50 |
| Coal tar xylol | 42 |
| High flash naphtha | 8 |
| Part B (1 part by volume): | |
| Polyamide resin (liquid) | 62.25 |
| Tri-(dimethylaminomethyl) phenol | 5.75 |
| Xylol | 32.00 |

6 parts by volume of Part A and 1.5 part by volume of Part B are blended thoroughly and then sprayed on a distribution transformer. The liquid resin was not thick enough to apply a coating more than about 3 mils thick without the coating running on the vertical transformer surface. This example illustrates the criticality of including finely divided inorganic fillers to impart the necessary tack and flow characteristics essential to avoid running and sagging of the sprayed film coating.

The following examples are illustrative of resin compositions which are suitable for use in coating transformer tanks, covers, and associated hardware in accordance with this invention.

Example IV

| Part A (5 parts by volume): | Percent |
|---|---|
| Magnesium silicate | 10 |
| Zinc oxide | 20 |
| Carbon black | 20 |
| Epoxy resin | 25 |
| Toluene | 25 |
| Part B (2 parts by volume): | |
| Polyamide resin (liquid) | 65 |
| Xylol | 35 |

Example V

| Part A (3 parts by volume): | Percent |
|---|---|
| Silica | 15 |
| Bentonite | 30 |
| Iron oxide | 3 |
| Silicone resin | 1 |
| Epoxy resin | 25 |
| Coal tar xylol | 20 |
| Isopropyl alcohol | 6 |
| Part B (2 parts by volume): | |
| Polyamide resin (liquid) | 70 |
| Tri-(dimethylaminomethyl) phenol | 4 |
| Benzene | 26 |

For certain applications, it is desirable to incorporate a plasticizing material in the previously described coating compositions. It has been found that a very suitable plasticizer comprises a glycidyl ether of an alkyl phenol having a chain length of about 7 to 18 carbon atoms attached to a ring carbon atom. Such compounds may be prepared readily by reacting extracts of cashew nut oil and epichlorohydrin. These plasticizers may be incorporated in the herein described compositions in various amounts depending upon the particular epoxy resin and polyamide resins employed and the character of the film desired.

An example of a satisfactory composition containing a plasticizer contains—

Part A:
    300 parts titanium dioxide
    650 parts aluminum oxide trihydrate
    8 parts silicone resin
    385 parts polyamide resin
    195 parts xylol
Part B:
    106 parts epoxy resin
    19 parts plasticizer
    17 parts xylol Upon mixing 25 parts of Part A with 10 parts of Part B, there is obtained a coating composition which may be applied conveniently to electrical apparatus by spray, brush, or flow coating.

While the present invention has been described with reference to what at present are considered to be preferred embodiments thereof, it will be understood, of course, that certain changes, substitutions, modifications and the like may be made therein without departing from its true scope.

I claim as my invention:

1. A process for applying a uniform 10 to 30 mils thick resin coating on electrical apparatus which comprises establishing a resin blend consisting of (A) from 3 to 8 parts by volume of a mixture consisting of from 20% to 40% of at least one normally liquid resinous polymeric epoxide which is a glycidyl polyether of a dihydric phenol having a 1,2-epoxy equivalency greater than 1.0, from 25% to 50% of a finely divided inorganic filler, and the balance solvent, and (B) from 0.5 to 3 parts by volume of a solvent solution of a normally liquid resinous polyamide derived by reacting at least one polyamine with at least one dimerized fatty acid containing from 8 to 24 carbon atoms per molecule, applying said resin blend to said electrical apparatus and heating the deposited coating at 125° C. to 175° C. to convert it to a hardened, thermoset state.

2. A transformer tank, tank cover, and associated hardware provided with a uniformly deposited 10 to 30 mils thick coating of a hardened resin blend, the resin blend consisting essentially of (A) from 3 to 8 parts by volume of a mixture consisting of from 20 to 40% of at least one normally liquid resinous polymeric epoxide which is a glycidyl polyether of a dihydric phenol having a 1,2-epoxy equivalency greater than 1.0, from 25% to 50% of a finely divided inorganic filler, and the balance solvent, and (B) from 0.5 to 3.0 parts by volume of a solvent solution of a normally liquid resinous polyamide derived by reacting diethylene triamine with linoleic acid, said resin blend having been applied to said transformer tank, tank cover, and associated hardware followed by heating at from 125° C. to 175° C.

3. The process of claim 1 wherein the polyamide is derived by reacting diethylene triamine with linoleic acid.

4. A process for applying a uniform 10 to 30 mils thick resin coating on electrical apparatus which comprises establishing a resin blend consisting of (A) from 3 to 8 parts by volume of a mixture consisting of from 20% to 40% of at least one normally liquid resinous polymeric epoxide which is a glycidyl polyether of a dihydric phenol having a 1,2-epoxy equivalency greater than 1.0, from 25% to 50% of finely divided aluminum oxide trihydrate, and the balance solvent, and (B) from 0.5 to 3 parts by volume of a solvent solution of a normally liquid resinous polyamide derived by reacting at least one polyamine with at least one dimerized fatty acid containing from 8 to 24 carbon atoms per molecule, applying said resin blend to said electrical apparatus and heating the deposited coating at 125° C. to 175° C. to convert it to a hardened, thermoset state.

5. Transformer apparatus provided with a uniformly deposited 10 to 30 mils thick coating of a hardened resin blend, the resin blend consisting essentially of (A) from 3 to 8 parts by volume of a mixture consisting of from 20 to 40% of at least one normally liquid resinous polymeric epoxide which is a glycidyl polyether of a dihydric phenol having a 1,2-epoxy equivalency greater than 1.0, from 25% to 50% of finely divided aluminum oxide trihydrate, and the balance solvent, and (B) from 0.5 to 3.0 parts by volume of a solvent solution of a normally liquid resinous polyamide derived by reacting diethylene triamine with linoleic acid, said resin blend having applied to said transformer apparatus followed by heating at from 125° C. to 175° C.

References Cited in the file of this patent
UNITED STATES PATENTS

| | | |
|---|---|---|
| 2,626,223 | Sattler et al. | Jan. 20, 1953 |
| 2,887,458 | Fitzgerald | May 19, 1959 |
| 2,943,953 | Daniel | July 5, 1960 |

OTHER REFERENCES

"Polymer Progress," Shell bulletin SC 55–5, May 1955 (pages 2 and 3 relied upon).

Ciba Company Technical Data Bulletin No. 8, Thermosetting Compositions Based on G.M.I. Polyamide 115 and Araldite Epoxy Resins, September 9, 1957, pages 2 and 4 relied on.

Shell Chemical Corp., Technical Bulletin SC 52–14, September 9, 1957 (page 2 relied upon).